United States Patent [19]
Jung

[11] Patent Number: 6,028,153
[45] Date of Patent: Feb. 22, 2000

[54] COPOLYMER RESIN OF MALEIMIDE AND ALICYCLIC OLEFIN-BASED MONOMERS, PHOTORESIST CONTAINING THE COPOLYMER RESIN AND THE PREPARATION THEREOF

[75] Inventor: Jae Chang Jung, Ichon-shi, Rep. of Korea

[73] Assignee: Hyundai Electronics Industries Co., Ltd., Rep. of Korea

[21] Appl. No.: 09/152,754

[22] Filed: Sep. 14, 1998

[30] Foreign Application Priority Data

Nov. 1, 1997 [KR] Rep. of Korea ...................... 97-57572

[51] Int. Cl.$^7$ .................................................. C08F 26/06
[52] U.S. Cl. ........................................... 526/258; 522/904
[58] Field of Search .............................. 526/258; 522/904

[56] References Cited

U.S. PATENT DOCUMENTS

| | | |
|---|---|---|
| 4,011,386 | 3/1977 | Matsumoto et al. . |
| 4,106,943 | 8/1978 | Ikeda et al. . |
| 4,491,628 | 1/1985 | Ito et al. ................................. 430/176 |
| 4,883,740 | 11/1989 | Schwalm et al. ....................... 430/270 |
| 5,087,677 | 2/1992 | Brekner et al. ........................ 526/160 |
| 5,212,043 | 5/1993 | Yamamoto et al. .................... 430/192 |
| 5,252,427 | 10/1993 | Bauer et al. ........................... 430/270 |
| 5,278,214 | 1/1994 | Moriya et al. . |

FOREIGN PATENT DOCUMENTS

| | | |
|---|---|---|
| 794458 | 9/1997 | European Pat. Off. . |
| 0836119A1 | 11/1997 | European Pat. Off. . |
| 5-297591 | 11/1993 | Japan . |
| 5-310885 | 11/1993 | Japan . |
| 128164 | 2/1977 | Netherlands . |
| 1329997 | 9/1970 | United Kingdom . |
| WO 96/37526 | 11/1996 | WIPO . |
| WO 97/33198 | 9/1997 | WIPO . |

OTHER PUBLICATIONS

"Synthesis and Dissolution Characteristics of Novel Alicyclic Polymers with Monoacid Ester Structures", Takashi Hattori, et al., pp. 535–544, *Journal of Photopolymer Science and Technology*, vol. 10, No. 4 (1997).

"New Protective Groups in Alicyclic Methacrylate Polymers for 193–nm Resists", Koji Nozaki and Ei Yano, pp. 545–550, *Journal of Photopolymer Science and Technology*, vol. 10. No. 4 (1997).

Thomas I. Wallow, et al., "Evaluation of Cycloolefin–Maleic Anhydride Alternating Copolymers as Single–Layer Photoresist for 193nm Photolithography", 1996, Proc. SPIE, vol. 2724, 355–364.

R.D. Allen et al., "The Influence of Photoacid Structure on the Design and Performance of 193nm Resists", 1997, Journal of Photopolymer Science and Technology, vol. 10, 503–510.

F.M. Houlihan et al., "A Commercially Viable 193nm single Layer Resist Platform", 1997, Journal of Photopolymer Science and Technology, vol. 10, 511–520.

J.C. Jung et al., "ArF Single Layer Resist Composed of Alicyclic Main Chain Containing Maleic Anhydride", 1997, Journal of Photopolymer Science and Technology, vol. 10, 529–533.

S.J. Choi et al., "New ArF Single–layer Resist for 193–nm Lithography", 1997, Journal of Photopolymer Science and Technology, vol. 10, 521–528.

K. Nakano et al., "Chemically Amplified Resist Based on High Etch–Resistant Polymer for 193–nm Lithography", 1997, Journal of Photopolymer Science and Technology, vol. 10, 561–569.

CA Register No. 100207–98–5.
CA Register No. 32759–57–2.
CA Register No. 27056–70–8.
CA Register No. 174659–58–6.
CA Register No. 28503–41–5.
CA Register No. 194997–59–6.
CA Abstract No. 104:149512 & Macromolecules 19(4) 1266–8 (1986).
CA Abstract No. 91:124064 & Makromol. Chem. 180(8) 1975–88 (1979).
CA Abstract No. 113:24734 & JP 02 051511.
CA Abstract No. 127:227269 & J Photopolym. Sci. Technol. 10(4) 529–534 (1997).
CA Abstract No. 124:317926 & Marcomol. Rapid Commun. 17(3) 173–180 (1996).
CA Abstract No. 124:203171 & Macromolecules 29(8) 2755–63 (1996).
CA Abstract No. 127:227308 & Proc. SPIE–Int. Soc. Opt. Eng. (1997) 3049 Advances in Resist Technology and Processing XIV 92–103.
CA Abstract No. 66:18889 & Magy. Kem. Foly. (1966) 72(11)491–3.
CA Abstract No. 199328–07–9.

*Primary Examiner*—Janet Baxter
*Assistant Examiner*—Amanda C. Walker
*Attorney, Agent, or Firm*—Townsend and Townsend and Crew LLP

[57] ABSTRACT

The present invention relates to a novel copolymer resin of maleimide and alicyclic olefin-based monomers, a photoresist containing the copolymer and a process for the preparation thereof. More specifically, the present invention relates to a novel copolymer resin of maleimide and alicyclic olefin-based monomers useful for a photoresist usable lithography process using ultra-short wavelength light source such as KrF($\lambda$=248 $\mu$m), ArF($\lambda$=193 $\mu$m), X-ray, ion beam, E-beam and EUV (Extreme Ultra Violet) which is a potentially applicable technology to the fabrication of a fine circuit of a highly integrated semiconductor device.

13 Claims, No Drawings

COPOLYMER RESIN OF MALEIMIDE AND ALICYCLIC OLEFIN-BASED MONOMERS, PHOTORESIST CONTAINING THE COPOLYMER RESIN AND THE PREPARATION THEREOF

BACKGROUND OF THE INVENTION

The present invention relates to a novel copolymer resin of maleimide and alicylic olefin-based monomers, a photoresist containing the copolymer resin and to a process for the preparation thereof. More specifically, the present invention relates to a novel copolymer resin of maleimide and alicyclic olefin-based monomers useful for a photoresist usable for lithography process using ultra-short wavelength light source such as KrF($\lambda$=248 $\mu$m), ArF($\lambda$=193 $\mu$m), X-ray, ion beam, E-beam and EUV (Extreme Ultra Violet) which is a potentially applicable technology to the fabrication of a fine circuit of a highly integrated semiconductor device. The present invention also relates to a photoresist formulated by using the above copolymer resin and to a process for the preparation thereof.

To achieve a high sensitivity in the integration process of semiconductor device, a chemical amplification photoresist for DUV (deep ultra violet) light source has been prevailing. The chemical amplification photoresist consists generally of a photoacid generator and a matrix polymer having a chemical structure which sensitively reacts with acid.

The mechanism of such a chemical amplification photoresist is as follows. The photoresist is exposed through a mask to a ultra violet light source. An acid is generated by the action of the photoacid generator and then, reacts with the main or side chain of the matrix polymer. This reaction surprisingly increases the solubility of the copolymer in a developing solution by changing the structure of the polymer, e.g., by decomposing it, cross-linking it or changing its polarity. Therefore, at exposed regions the copolymer is dissolved in the developing solution, whereas at un-exposed regions the copolymer has no change in its original structure and remains undissolved in the developing solution, so that the shape of the mask may leave as a positive image on a substrate. In the above lithographic process, the resolution depends on the wavelength of light source. Accordingly, the smaller the wavelength of light source, the finer the pattern formulated.

In general, a photoresist is required to have light transparency, etching resistance, thermal resistance and adhesion. In addition, the photoresist used for ArF photoresist must be developed in 2.38% TMAH aqueous solution. However, it would be difficult to prepare a copolymer resin which satisfies all the properties of photoresist. For instance, the copolymer resin having polyacrylate-based main chain structure can easily be synthesized, but there are problems in an etching resistance and in a development process. The etching resistance can be improved by introducing alicyclic unit into main chain of the copolymer resin, but it is difficult to substitute the entire main chain by alicyclic unit.

In an attempt to solve the above problems, Bell Lab. has proposed a copolymer resin of the following formula (1), having a main chain structure substituted by norbornene, acrylate and maleic anhydride.

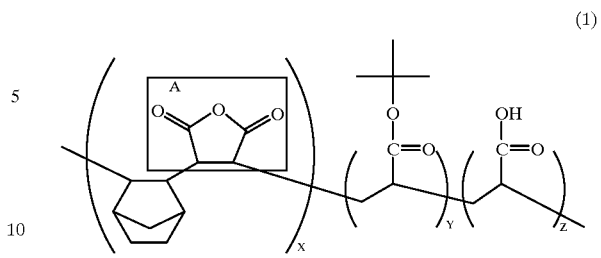

In this copolymer resin, maleic anhydride, A-moiety of the formula (1), used for the polymerization of an alicyclic olefin group does not absorb a light of 193 nm in wavelength and is the only material capable of polymerizing with the alicyclic unit, i.e., norbornene. However, the maleic anhydride, upon non-exposure, is easily dissolved in 2.38% TMAH aqueous solution and occurs top-loss phenomenon in which the top of the photoresist pattern becomes round. Therefore, this copolymer resin is not suitable to the resin for KrF or ArF lithography.

Accordingly, to inhibit dissolution, it is necessary to increase the ratio of t-butyl substituent, y-moiety of the formula (1). In this instance, the ratio of carboxylate substituent, Z-moiety of the formula (1), which increases the adhesion is reduced and thus, the photoresist is departed from the wafer upon actual patterning and the pattern formulation is not possible.

In addition, upon post exposure delay which does not conduct a baking immediately after exposure, the bottom of the pattern is shorter than the top of the pattern. That is, T-top phenomenon occurs and thus the pattern formulation itself is not possible. Also, since maleic anhydride reacts with hydroxyl group (—OH) which increases adhesion, there is a possibility of giving an influence on a shelf life of photoresist.

Accordingly, Bell Labs. has attempted to solve such disadvantages by introducing as a bi-component dissolution inhibitor an alternating copolymer of cycloolefin and maleic anhydride. However, since this method must use a dissolution inhibitor in the excessive amount, about 30% by weight of the copolymer resin, a reproductivity of the resin is low and the cost is increased. Accordingly, this resin also is not suitable as a photoresist resin.

SUMMARY OF THE INVENTION

As a first aspect, the present invention provides a novel copolymer resin of maleimide and alicylic olefin-based monomers. The copolymer has the formula (2):

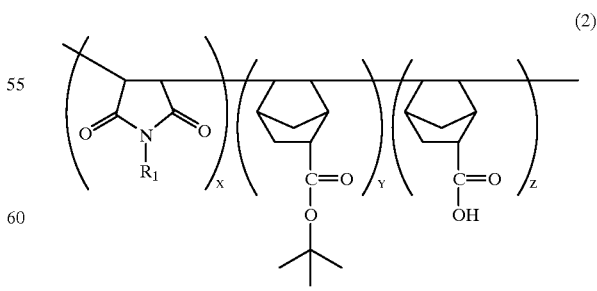

wherein $R_1$ represents a primary, secondary or tertiary aliphatic alcohol having from 1 to 10 carbon atoms and X:Y:Z=100:60–95:5–40 by mole ratio.

As a second aspect, the present invention provides a process for preparing a copolymer resin of the formula (6)

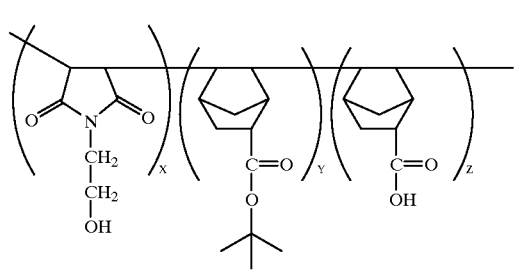

(6)

wherein, X:Y:Z=100:60–95:5–40 by mole ratio.

The process comprises the steps of (i) dissolving N-(2-hydroxyethyl)maleimide, t-butyl 5-norbornene-2-carboxylate and 5-norbornene-2-carboxylic acid in a solvent; (ii) adding a polymerization initiator to produce a reaction solution; (iii) reacting the reaction solution under nitrogen or argon atmosphere to produce a reaction product; and (iv) precipitating and drying the reaction product to produce the copolymer resin.

As a third aspect, the present invention provides a process for preparing a copolymer resin of the formula (8)

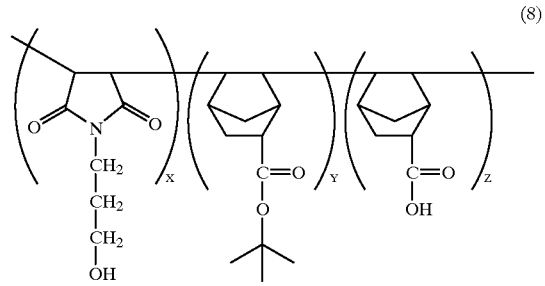

(8)

wherein, X:Y:Z=100:60–95:5–40 by mole ratio.

The process comprises the steps of (i) dissolving N-(3-hydroxypropyl)maleimide, t-butyl 5-norbornene-2-carboxylate and 5-norbornene-2-carboxylic acid in a solvent; (ii) adding a polymerization initiator to produce a reaction solution; (iii) reacting the reaction solution under nitrogen or argon atmosphere to produce a reaction product; and (iv) precipitating and drying the reaction product to produce the copolymer resin.

As a fourth aspect, the present invention provides a photoresist comprising the copolymer resin of the formula (2) above, a photoacid generator and a solvent. The present invention also provides semiconductor devices including the photoresist of the present invention.

In yet another aspect, the present invention provides a process for preparing the photoresist of the present invention. The process comprises the steps of (i) mixing the copolymer resin of the formula (2) above with a photoacid generator and a solvent to produce a reaction product; and (ii) filtering the reaction product.

These and other aspects of the present invention are described further in the detailed description and examples of the invention which follow.

DESCRIPTION OF THE PREFERRED EMBODIMENT

The present inventors have extensively studied and experimented to develop a copolymer resin which satisfies all the properties of photoresist. As a result, we have found that a maleimide-introduced photoresist resin can easily be copolymerized with alicyclic olefin unit, has a physical property capable of enduring in 2.38%. TMAH developer and increase adhesion of KrF or ArF photoresist, and then completed the present invention.

Thus, it is a primary object of the present invention to provide a novel copolymer resin of maleimide and alicyclic-based monomers represented by the following formula (2):

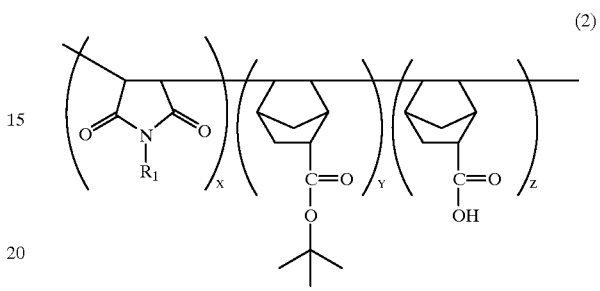

(2)

wherein $R_1$ represents a primary, secondary or tertiary aliphatic alcohol having from 1 to 10 carbon atoms and X:Y:Z=100:60–95:5–40 by mole ratio.

Another object of the present invention is to provide a photoresist formulated by mixing the copolymer resin of the formula (2) and a photoacid generator in a solvent.

A further object of the present invention is to provide a process for formulating a photoresist which comprises mixing the copolymer resin of the formula (2) with a photoacid generator and a solvent.

The alicyclic olefin-based monomers which may be used in the photoresist copolymer resin of formula (2) according to the present invention are selected from the group consisting of maleic anhydride, vinylene carbonate, 2-cyclopentene-1-acetic acid, 2-cyclopentene-1-(t-butylacetate), bicyclo[2,2,2]oct-5-ene-2-carboxylic acid, t-butyl bicyclo[2,2,2]oct-5-ene-2-carboxylate, 2-hydroxyethyl bicyclo[2,2,2]oct-5-ene-2-carboxylate, 2-hydroxyethyl 5-norbornene-2-carboxylate, t-butyl 5-norbornene-2-carboxylate, 5-norbornene-2-carboxylic acid, cyclohexene, norbornylene, norbornylene-2-methanol and methyl5-norbornene-2,3-dicarboxylate.

The maleimide-based monomer used in the copolymer resin of the formula (2) according to the present invention includes N-(2-hydroxy ethyl)maleimide or N-(3-hydroxy propyl)maleimide.

The photoresist copolymer resin used in the present invention may be prepared by polymerizing maleimide-based monomers such as 2-hydroxyethyl maleimide or 3-hydroxypropyl maleimide with one or more alicylic olefin monomers in the presence of a radical polymerization initiator. For instance, the polymerization is carried out by a bulk polymerization or a solution polymerization. The polymerization initiator includes benzoylperoxide, 2,2-azobisisobutyronitrile (AIBN), acetyl-peroxide, laurylperoxide or t-butylperacetate. As a polymerization solvent, cyclohexanone, tetrahydrofurane, methylethylketone, benzene, toluene, dioxane, dimethylformamide alone or the combinations thereof may be used.

A photoresist composition useful for formulating fine patterns of semiconductor devices may be obtained by mixing the photoresist copolymer of the formula (2) according to the present invention with a photoacid generator in a solvent. Specifically, the copolymer resin of the present invention is first dissolved in cyclohexanone to which is added a photoacid generator. The reaction solution is stirred. The reaction solution is then filtered with an ultra fine filter to obtain a photoresist solution. The filtering is preferably carried out through 0.005 to 0.015 μm membrane filter.

As the photoacid generator, triphenylsulfonium triflate, dibutyl naphthyl sulfonium triflate, 2,6-dimethylphenylsulfonate, bis(arylsulfonyl)-diazomethane, oximesulfonate, 2,1-diazonaphthoquinone-4-sulfonate, etc. may be used. Preferably sulfonium or onium salt and more preferably triphenylsulfonium triflate or dibutylsulfonium triflate may be used. The photoacid generator is used in the amount of from 0.01 to 10% by weight with respect to the total weight of the copolymer resin used. As the solvent, 3-methoxymethyl propionate or a conventional organic solvent are preferred.

The amount of the copolymer resin varies depending upon the solvent, the photoacid generator and lithography conditions. The copolymer resin is preferably used in the amount of from about 10 to about 30% by weight based upon the total weight of the solvent used.

The resulting photoresist solution is spin-coated on a silicon wafer which is then soft-baked at a temperature of from about 80° C. to about 150° C. for from about 1 to about 5 minutes in an oven or on a hot plate. The soft-baked wafer is exposed by a stepper which uses a deep UV light or an excimer laser as a light source. Thereafter, the wafer is subjected to post-baking at a temperature of from about 100° C. to about 200° C. An ultra fine positive resist image can be obtained by immersing the post-baked wafer in 2.38% TMAH aqueous solution for about 90 seconds.

The present invention will be more specifically explained by the following examples. However, it should be understood that the technical scope of the present invention will not be limited to those examples in any manner. In these examples, "g" means grams; "ml" means milliliters; "mol" means mole(s); "μm" means micrometer; "%" or "percent" means percent by weight unless otherwise indicated; "°C" means degrees Centigrade; "THF" means tetrahydrofuran; and "AIBN" means 2,2t-azobis isobutyronitrile.

EXAMPLE 1

Synthesis of N-(2-hydroxyethyl)maleimide monomer (3)

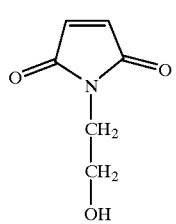

(3)

Ethanolamine (31 g) was dissolved in 200 g of dimethylformamide solvent purified in a reactor, to which was added 49 g of maleic anhydride. The mixture was stirred for 8 hours. The reaction solution was imidized by reacting with 250 g of acetic anhydride and 15 g of sodium acetate at 80° C. for 24 hours. After the reaction was completed, sodium acetate was filtered off, and glacial acetic acid and solvent were removed in a rotary evaporator, to which was added water and tetrahydrofuran. The organic layer was separated in a fraction funnel. To the 2-maleimidethyl acetate contained in the organic layer was added 200 ml of 3% TMAH aqueous solution and the mixture was reacted at 60° C. for 10 hours to obtain 28 g of the monomer (3) in a yield of 35% by weight of the reactants.

EXAMPLE 2

Synthesis of t-Butyl-5-norbornene-2-carboxylate monomer (4)

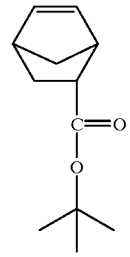

(4)

Cyclopentadiene (1 mol) and 1.2 mol of t-butylacrylate were dissolved in 500 g of THF solvent. The reaction was carried out at 30° C. for 24 hours. The solvent was removed in rotary evaporator, and then distilled under reduced pressure to obtain 155 g of the monomer (4) as a mixture of endo and exo, in a yield of 80% based upon the weight of the reactants.

EXAMPLE 3

Synthesis of 3-Norbornene-2-carboxylic acid monomer (5)

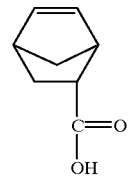

(5)

Cyclopentadiene (1 mol) and 1.2 mole of acrylic acid were dissolved in 500 g of THF solvent. The reaction was carried out at 30° C. for 24 hours. The solvent was removed in a rotary evaporator, and then distilled under reduced pressure to obtain 144 g of the monomer (5) as a mixture of endo and exo, in a yield of 83%.

EXAMPLE 4

Synthesis of Poly[N-(2-hydroxyethyl)maleimide/t-butyl-5-norbornene-2-carboxylate/5-norbornene-2-carboxylic acid]copolymer resin (6)

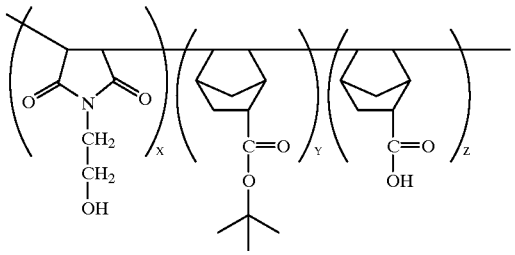

(6)

wherein, X:Y:Z=100:60–95:5–40 by mole ratio.

N-(2-Hydroxyethyl)maleimide (3) (0.5–1 mol), 0.1–1 mol of t-butyl 5-norbornene-2-carboxylate (4), and 0.01 to 0.3 mol of 5-norbornene-2-carboxylic acid (5) were dissolved in 150 to 250 g of THF solvent to which was added 0.5 to 10 g of AIBN as a polymerization initiator. The reactor was converted into nitrogen or argon atmosphere. The reaction was carried out at a temperature of 60° C. to 75° C. for 4 to 24 hours. After the reaction was completed, the resulting crude resin was precipitated with ethyl ether. The precipitate was filtered and dried in a vacuum oven to obtain the title copolymer resin (6). The molecular weight of the copolymer resin thus prepared was about 7,500 and the dispersity was 1.45.

EXAMPLE 5

Formulation of Photoresist Pattern

Poly[N-(2-hydroxyethyl)maleimide/t-butyl-5-norbornene-2-carboxylate/5-norbornene-2-carboxylic acid] (10 g) copolymer resin (6) obtained from Example 4 was dissolved in 40 g of methyl 3-methoxy propionate solvent to which was added 0.1 to 0.6 g of triphenylsulfonium triflate or dibutylnaphthylsulfonium triflate as a photoacid generator and then stirred. The reaction product was filtered through 0.005 to 0.015 µm filter and then coated on the surface of the wafer to formulate a fine pattern.

EXAMPLE 6

Synthesis of N-(3-hydroxypropyl)maleimide monomer (7)

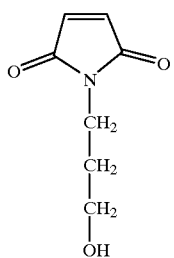

(7)

3-Aminopropanol (38 g) was dissolved in 200 g of purified dimethylformamide solvent to which was added 49 g of maleic anhydride and then stirred for 8 hours. The reaction solution was imidized by reacting by the addition of 250 g of acetic anhydride and 15 g of sodium acetate at 80° C. for 24 hours. After the reaction was completed, sodium acetate was removed by a filter. Then, glacial acetic acid and solvent was removed in rotary evaporator to which was added water and tetrahydrofuran. The organic layer was separated in a fraction funnel. To the 2-maleimidethyl aceate contained in the organic layer was added 200 ml of 3% TMAH aqueous solution and reacted at 60° C. for 10 hours to obtain 20 g of the monomer (7) in a yield of 24%.

EXAMPLE 7

Synthesis of Poly[N-(3-hydroxypropyl)maleimide/t-butyl-5-norbornene-2-carboxylate/5-norbornene-2-carboxylic acid]copolymer resin (8)

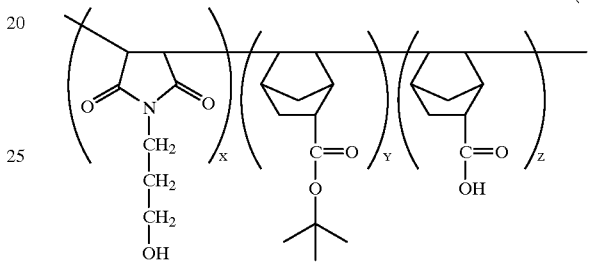

(8)

wherein, X:Y:Z=100:60–95:5–40 by mole ratio.

N-(3-Hydroxypropyl)maleimide (7) (0.5–1 mol), 0.1 to 1 mole of t-butyl 5-norbornene-2-carboxylate (4) and 0.01 to 0.3 mole of 5-norbornene-2-carboxylic acid (5) were dissolved in 150 g to 250 g of THF solvent to which was added 0.5 g to 10 g of AIBN as a polymerization initiator. The reactor was converted into a nitrogen or argon atmosphere. The reaction was carried out at a temperature of 60° C. to 75° C. for 4 to 24 hours. After the reaction was completed, the resulting crude resin was precipitated with ethyl ether or hexane. The precipitate was filtered and dried in a vacuum oven to obtain the copolymer resin (8).

The molecular weight of the copolymer resin thus prepared was about 7,500 and the dispersity was 1.45.

EXAMPLE 8

Formulation of photoresist pattern

Poly[N-(3-hydroxypropyl)maleimide/t-butyl 5-norbornene-2-carboxylate/5-norbornene-2-carboxylic acid] copolymer resin (8) (10 g) obtained from Example 7 was dissolved in 40 g of methyl 3-methoxy propionate solvent, to which was added 0.1 to 0.6 g of triphenylsulfonium triflate or dibutylnaphthylsulfonium triflate as a photoacid generator and the mixture was stirred. The reaction product was filtered through a 0.10 µm filter and then coated on the surface of the wafer to formulate a fine pattern.

The present inventors have identified through experiments that when the semiconductor device is prepared by using a photoresist pattern formulated in Examples 5 and 8, a 0.13 µm fine pattern is formulated.

The maleimide-introduced copolymer resin for photoresist according to the present invention can easily be copolymerized with an alicyclic olefin unit, has a physical property capable of enduring in 2.38% TMAH developer and increases adhesion of ArF photoresist. The photoresist film using the copolymer resin according to the present invention can be applied to highly integrated semiconductor devices.

Although the invention has been described in its preferred form with a certain degree of particularity, it is appreciated by those skilled in the art that the present disclosure of the preferred form has been made only by way of example and that numerous changes in the details of the construction, combination and arrangement of parts may be resorted to without departing from the sprit and scope of the invention. The invention is defined by the following claims, with equivalents of the claims to be included therein.

That which is claimed is:

1. A novel copolymer resin of maleimide and alicylic olefin-based monomers, said copolymer having the formula (2):

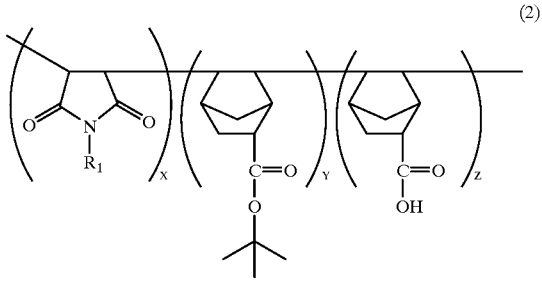

(2)

wherein $R_1$ represents a primary, secondary or tertiary aliphatic alcohol having from 1 to 10 carbon atoms and X:Y:Z=100:60–95:5–40 by mole ratio.

2. The copolymer resin of claim 1, wherein the alicyclic olefin-based monomers are selected from the group consisting of maleic anhydride, vinylene carbonate, 2-cyclopentene-1-acetic acid, 2-cyclopentene-1-(t-butylacetate), bicyclo[2,2,2]oct-5-ene-2-carboxylic acid, t-butyl bicyclo[2,2,2]oct-5-ene-2-carboxylate, 2-hydroxyethyl bicyclo[2,2,2]oct-5-ene-2-caboxylate, 2-hydroxyethyl 5-norbornene-2-carboxylate, t-butyl 5-norbornene-2-carboxylate, 5-norbornene-2-carboxylic acid, cyclohexene, norbornylene, norbornylene-2-methanol and methyl-5-norbornene-2,3-dicarboxylate.

3. The copolymer resin of claim 1, wherein the maleimide-based monomer is N-(2-hydroxyethyl) maleimide or N-(3-hydroxy propyl) maleimide.

4. The copolymer resin of claim 1, wherein the copolymer is poly[N-(2-hydroxyethyl)maleimide/t-butyl 5-norbornene-2-carboxylate/5-norbornene-2-carboxylic acid]copolymer having the formula (6):

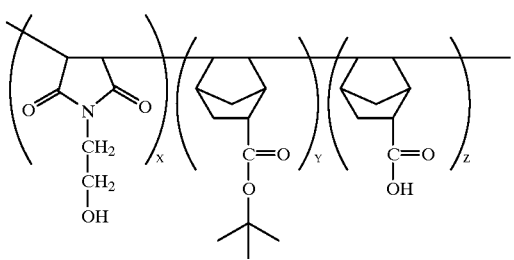

(6)

wherein, X:Y:Z=100:60–95:5–40 by mole ratio.

5. The copolymer resin of claim 1, wherein the copolymer is poly[N-(3-hydroxypropyl)maleimide/t-butyl 5-norbornene-2-carboxylate/5-norbornene-2-carboxylic acid]represented by the following formula (8):

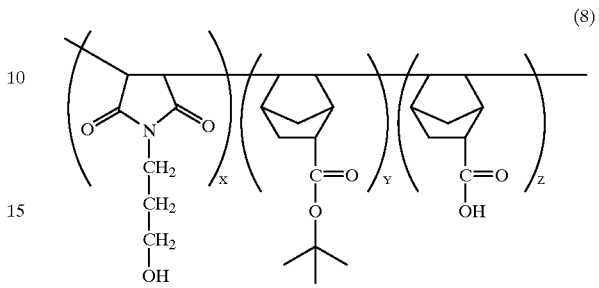

(8)

wherein, X:Y:Z=100:60–95:5–40 by mole ratio.

6. A process for preparing a copolymer resin of the formula (6):

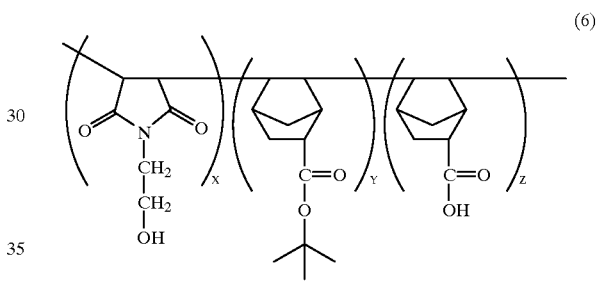

(6)

said process comprising the steps of:

(i) dissolving N-(2-hydroxyethyl)maleimide, t-butyl 5-norbornene-2-carboxylate and 5-norbornene-2-carboxylic acid in a solvent;

(ii) adding a polymerization initiator to the resultantsolution of step (i) to produce a reaction solution;

(iii) laying said reaction solution under nitrogen or argon atmosphere to produce a reaction product; and (iv) precipitating and drying said reaction product to produce said copolymer resin.

7. The process of claim 6, wherein step (i) comprises dissolving from 0.5 to 1 mole of N-(2-hydroxyethyl) maleimide, from 0.1 to 1 mole of t-butyl 5-norbornene-2-carboxylate, and from 0.01 to 0.3 mole of 5-norbornene-2-carboxylic acid in from 150 to 250 g of tetrahydrofuran solvent.

8. The process of claim 6, wherein the polymerization initiator is from 0.5 to 10 g of 2,2'-azobisisobutyronitrile.

9. The process of claim 6, wherein step (iii) is carried out for 4 to 24 hours at a temperature of from 60° C. to 75° C.

10. A process for preparing a copolymer resin of the formula (8):

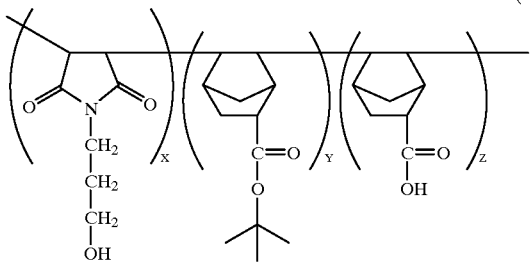

(8)

wherein, X:Y:Z=100:60–95:5–40 by mole ratio.
said process comprising the steps of:
(i) dissolving N-(3-hydroxypropyl)maleimide, t-butyl 5-norbornene-2-carboxylate and 5-norbornene-2-carboxylic acid in a solvent;
(ii) adding a polymerization initiator to the resultant solution of step (ii) to produce a reaction solution;
(iii) laying said reaction solution under nitrogen or argon atmosphere to produce a reaction product; and
(iv) precipitating and drying said reaction product to produce said copolymer resin.

11. The process of claim 10, wherein the step (i) is carried out by dissolving from 0.5 to 1 mole of N-(3-hydroxypropyl) maleimide, from 0.1 to 1 mole of t-butyl 5-norbornene-2-carboxylate and from 0.01 to 0.3 mole of 5-norbornene-2-carboxylic acid in from 150 to 250 g of tetrahydrofuran solvent.

12. The process of claim 10, wherein polymerization initiator is from 0.5 to 10 g of 2,2'-azobisisobutyronitrile.

13. The process of claim 10, wherein step (iii) comprises reacting the reaction solution for 4 to 24 hours at a temperature of from 60° C. to 75° C.

* * * * *